Aug. 28, 1956 P. R. FECHHEIMER 2,760,704
CUT-OFF MECHANISM FOR FILLING MACHINES
Filed Nov. 20, 1953 2 Sheets-Sheet 1
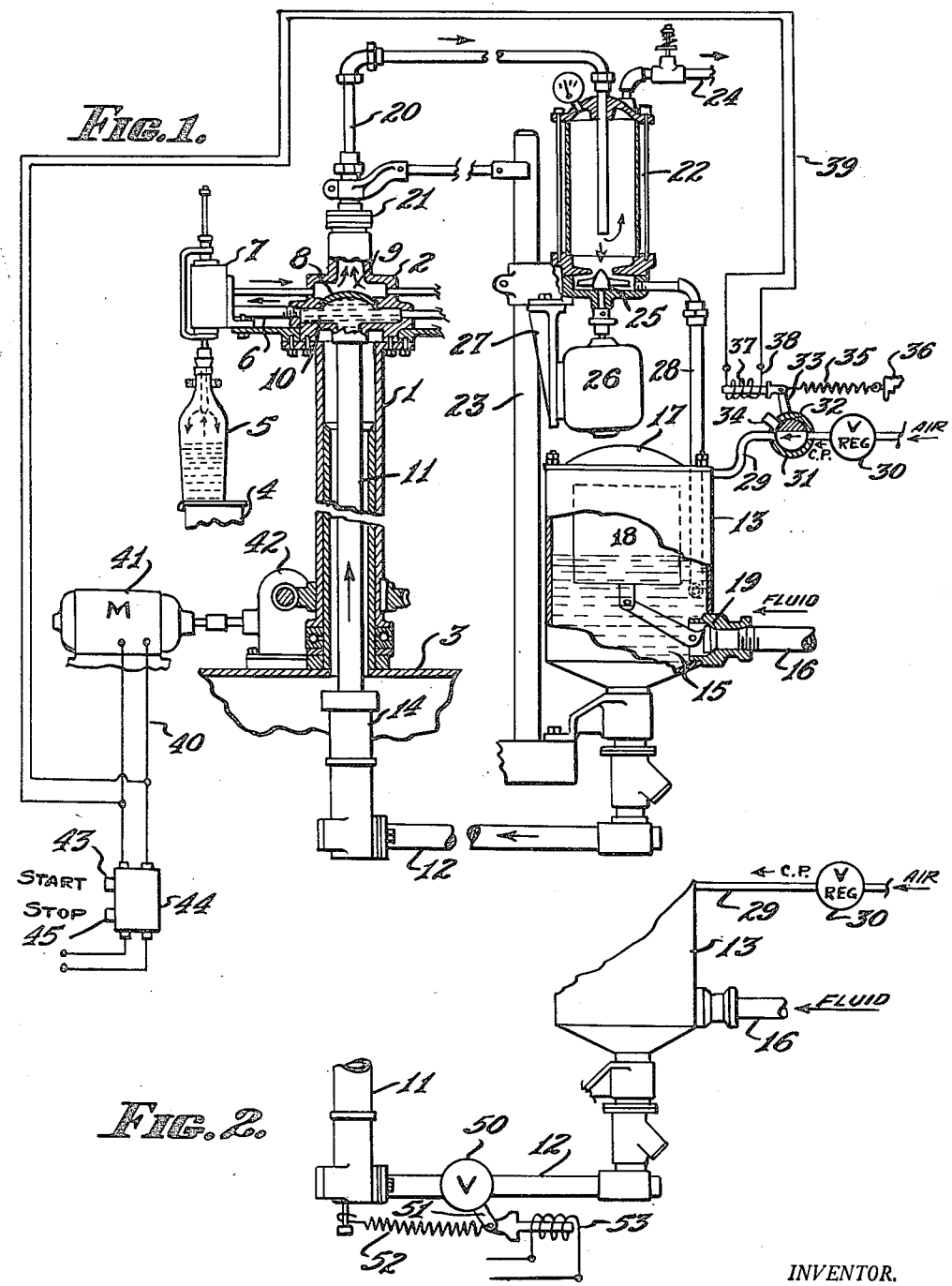
INVENTOR.
PAUL R. FECHHEIMER,
BY
*Allen & Allen*
ATTORNEYS.

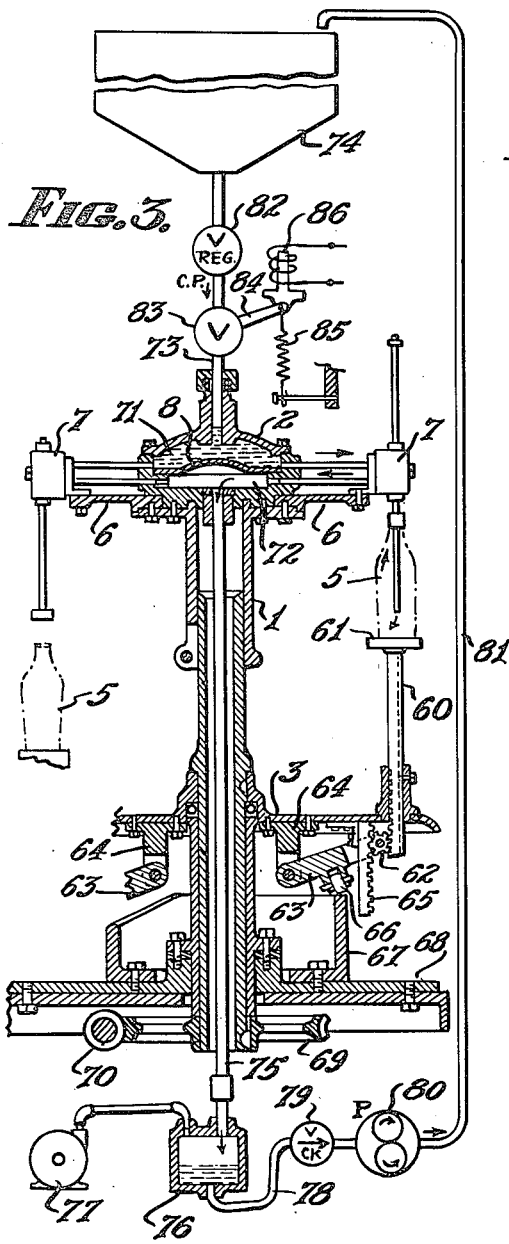

United States Patent Office 2,760,704
Patented Aug. 28, 1956

2,760,704

CUT-OFF MECHANISM FOR FILLING MACHINES

Paul R. Fechheimer, Cincinnati, Ohio, assignor to The Karl Kiefer Machine Company, Cincinnati, Ohio, a corporation of Ohio Application November 20, 1953, Serial No. 393,365

8 Claims. (Cl. 226—98)

My invention relates to machines for filling containers such, for example, as bottles or cans, and the instant application is a continuation-in-part of my co-pending application Serial No. 164,715, filed May 27, 1950, and entitled Pressure-and-Vacuum Filling Machine, now Patent No. 2,660,357 of November 24, 1953.

In my said co-pending application I have taught a pressure-vaccum filling machine in which the filling of bottles is speeded up by both drawing a vacuum on them and introducing the filling material under a pressure other than atmospheric. In essence, a closed system was provided with a container to be filled in which filling material under pressure was supplied to the container from a closed reservoir on which superatmospheric pressure was exerted, and a vacuum was drawn on the container to exhaust air from the container as well as remove any overfill, the exhaust conduit leading to a trap having a liquid transmitting connection with the reservoir including a pump having sufficient force to overcome the suction on the trap and the superatmospheric pressure on the reservoir, so as to return the overfill liquid from the trap to the pressurized reservoir. The reservoir was pressurized by means of a conduit connected to a source of air or other gas under pressure and the conduit was provided with a pressure control valve and a solenoid controlled relief valve effective upon stoppage of the machine to vent the pressurized reservoir, thereby relieving pressure on the filling material.

The instant application relates specifically to the provision of cut-off means for stopping the flow of filling material to the containers being filled upon stoppage of the machine for any reason.

It is a principal object of my invention to provide cut-off means effective upon the stoppage of the filling machine to cut-off the flow of filling material to the containers being filled.

It is a further object of my invention to provide cut-off mechanism of the character described in which the cut-off mechanism is electrically connected to the circuit of the prime mover of the filling machine in such a way that the cut-off means will be actuated only when the prime mover is stopped.

It is a further object of my invention to provide cut-off means of the character described which are effective for any filling machine in which filling material is supplied to the containers being filled under pressure, irrespective of whether the filling material is supplied by gravity, by pump or under superatmospheric pressure.

These and other objects of my invention which will appear hereinafter or which will be apparent to the skilled worker in the art upon reading these specifications, I accomplish by that construction and arrangement of parts of which I shall now describe certain exemplary embodiments.

Reference is now made to the accompanying drawings wherein:

Figure 1 is a partial elevation with parts in section of filling apparatus incorporating my invention.

Figure 2 is a partial elevation illustrating an alternative arrangement for the cut-off valve mechanism.

Figure 3 is a partial vertical sectional view of another type of filling apparatus employing the features of my invention.

Figure 4 is a partial vertical sectional view of yet another filling apparatus employing the features of my invention.

Referring now to Figure 1, I have therein illustrated the main parts of an exemplary filling machine. This machine comprises a central rotating column 1 which bears at its upper end a main head 2, and is connected at its lower end to a table 3 on which are mounted lifting means 4 for supporting containers 5 and raising and lowering them as required. The main head of the apparatus has means 6 for supporting a plurality of filling heads 7 in proper position to contact the containers 5 supported on the lifting means 4. In the embodiment illustrated, the main head has a hollow interior, divided by a diaphragm 8 into two chambers 9 and 10, the first of which is a vacuum chamber and the last of which is a chamber for the filling material. The chamber 10 is connected by a vertical conduit 11 inside the column 1, with a conduit 12 leading to a supply tank 13. The connection between the conduits 11 and 12 is through a gland 14 which will permit rotation of the conduit 11 with the column 1, as will be understood in the art.

The supply tank 13 for the filling material 15 is arranged to be supplied by a conduit 16 from a source of supply not shown. Since, in the embodiment illustrated, a superatmospheric pressure of air is to be built up in the supply tank 13, it is closed by a suitable cover 17; and it will be understood that the filling material will be supplied through the conduit 16 at a pressure sufficient to overcome the internal pressure in the supply tank 13. This may be accomplished in various ways, but the introduction of the filling material into the supply tank by means of a pump will ordinarily be found most convenient. The supply tank 13 may be provided with a float 18 operating a valve 19 to prevent overfilling and to maintain in the supply tank 13 a substantially constant level of the filling material.

The vacuum chamber 9 of the main head 2 is connected by a conduit 20 provided with a gland 21 to permit rotation of the main head, with a vacuum chamber and trap 22 mounted upon a suitable support 23 on the machine frame. The vacuum chamber and trap will be connected by a conduit 24 to a vacuum pump (not shown). Any increments of filling material coming over into the vacuum chamber and trap 22 will be separated from the air stream therein, and will be returned to the storage tank 13 through a pump 25, located at the bottom of the tank 22, the pump being driven by a motor 26 mounted on bracket 27 supported from support 23 and connected with the supply tank 13 by a conduit 28. It will be understood that the pump 25 will operate with sufficient force to overcome the reaction of superatmospheric pressure in the supply tank 13.

Pressure is built up in the supply tank 13 by connecting it, through a conduit 29 with a source of air or other gas under pressure, such as a pump or tank (not illustrated). The conduit 29 may be provided with a pressure control valve 30 which will regulate the pressure imposed upon the supply tank 13, and a cut-off valve 31 will also be provided in the conduit 29 between the pressure regulator 30 and the supply tank 13. While various valve arrangements may be employed, I have illustrated a simple one in which the valve 31 is a rotary valve having a core 32 with an operating arm 33. The core is so arranged and configured that in the position illustrated the conduit 29 is connected to the source of air or gas under pressure. When the operating arm 33 is moved clockwise, the valve core is moved to a position in which the conduit 29 is disconnected from the pressure line and is connected to an open tube 34 so that superatmospheric pressure in the supply tank 16 is rapidly relieved. By attaching a tension spring 35 to the operating arm 33 and to an external support 36, the valve core will be normally urged to the vent position in which the conduit 29 is connected to the open tube 34. The armature 37 of a solenoid having a coil 38 is also connected to the operating arm, and the coil 37 is connected through leads 39 in parallel with the motor circuit 40 of prime mover 41 operatively connected through gear box 42 to rotating column 1 and table 3. The arrangement is such that when start button 43 of control switch 44 is depressed to actuate prime mover 41 and hence start the machine, the solenoid will be actuated to move the operating arm 33 in a counterclockwise direction against the tension of spring 35, thereby connecting the conduit 29 to the source of air or gas under pressure. The solenoid will hold the valve 31 in this position until the machine is stopped, i. e., the motor circuit 40 broken by means of the stop switch 45, whereupon the solenoid will release the operating arm 33 for clockwise movement under the influence of spring 35. It will be understood that the machine may be provided with safety mechanisms, known in the art, which will produce stoppage upon the occurrence of various contingencies such as failure of the feeding means for containers, absence of a container on any of the lifting means 4, breakage of a container in the machine, and the like. In Figure 2 I have illustrated an alternative construction for effecting the positive cut-off of the flow of filling material in a filling machine of the general character illustrated in Figure 1. In this embodiment, the supply tank 13 is again pressurized by means of air or gas under pressure introduced into the tank through conduit 29 and pressure regulator 30. In this instance, however, the vent valve is omitted from the conduit 29 and replaced by a cut-off valve 50 in the conduit 12 connecting the supply tank 13 to the vertical conduit 11 supplying filling material to the filling head. The cut-off valve 50 is provided with an operating arm 51 adapted to open and close the valve, and the arm 51 is connected to a tension spring 52 serving to normally bias the valve 50 to the closed position. The solenoid 53 is also connected to the operating arm 51, and the arrangement is such that the solenoid will be energized when the motor 41 is started, thereby causing the valve 50 to be moved to the open position. Filling material will flow through the conduit 12 until the machine is stopped, whereupon the solenoid 53 will be de-energized and the valve 50 will be closed under the influence of tension spring 52. This will result in the immediate cutting off of pressure in the conduit. The supply tank 13, will, however, remain pressurized at all times and hence be capable of supplying a full head of pressure immediately upon re-starting of the machine. The head of pressure in the supply tank 13 will, of course, be determined by the regulator valve 30.

A modified filling machine is illustrated in Figure 3 wherein, however, like parts have been given like index numerals. The table 3, in this instance, carries vertically journaled toothed rods or racks 60 terminating upwardly in platforms 61 for the containers 5. A pinion 62 mounted on a lever 63 pivoted to a downwardly extending bracket 64 on the table 3 meshes with the teeth on the rack 60 and with the teeth on another rack 65 fixed beneath the table. This constitutes a motion multiplying mechanism, so that a given movement of the lever 63 produces a greater movement of the platform 61. The lever bears a cam follower 66 which engages the surface of a cam 67 fixed to the base 68 of the machine. As the table and column rotate with respect to this base, the platforms 61 and the containers on them are moved from extreme downward positions as shown diagrammatically at the left-hand side of Figure 3 to extreme upward positions as shown at the right-hand side of that figure. This mechanism is especially useful for the filling of tall containers, where for reasons known in the art, it is desirable to move a filling spout into the container and downwardly to near the bottom of it.

It will be understood that the machine will be driven by a suitable source of power (not shown). In Figure 3 there is indicated a worm wheel 69 on the lower end of the column 1 meshing with a worm 70 which will be driven, directly or otherwise by an electric motor, such as the motor 41 illustrated in Figure 1.

In the embodiment illustrated in Figure 3 the main head 2 is divided as before into two chambers by the diaphragm 8; but in this instance the upper chamber 71 is a chamber for the filling material, while the lower chamber 72 is a vacuum or suction chamber. The upper chamber is connected by a conduit 73 with a storage tank 74 for the filling material. This storage tank, if desired, may constitute a bulk storage tank or source of supply of filling material to the elimination of a smaller, float-controlled reservoir such as that illustrated in Figures 1 and 2. The storage tank 74 will be positioned above the filling machine so that the filling material may be fed by gravity to the filling head.

The lower chamber 72 is connected by a conduit 75 with a trap 76 having connections with a vacuum pump 77 and also, through a conduit 78 and a check valve 79, with a pump 80 and the storage tank 74 through conduit 81. The pump 80, in this instance, need have sufficient power only to return the overfill from the trap 76 to the storage tank 74, since the storage tank is not under superatmospheric pressure.

In this instance, the flow of filling material through the conduit 73 is controlled by the pressure regulating valve 82 and cut-off valve 83 having operating arm 84, tension spring 85 and solenoid 86 operatively connected to the motor circuit. As before, starting of the machine drive will result in energizing solenoid 86 which opens the conduit 73 to the flow of filling material to the filling chamber 71. Stoppage of the machine results in the release of the operating arm 84 and closing of the valve under the influence of spring 85. Thus, again, positive and instantaneous release of the filling pressure is effected upon stoppage of the machine.

In Figure 4 I have illustrated yet another modification of my invention where the source of filling material 90 comprises a storage tank located beneath the filling machine which is otherwise similar to that disclosed in Figure 1; and like parts have been given like index numerals. In this instance, however, filling material is supplied to the vertical conduit 11 through conduit 91, there being a pump 92 of sufficient power to pump the filling material to the filling head. A pressure regulator 93 is imposed in the conduit 91 as is a cut-off valve 94 controlled by solenoid 95 and tension spring 96. As will be evident, when the solenoid 95 is energized the valve will be moved to the open position, whereas upon de-energizing of the solenoid, the valve will be closed under the influence of spring 96. In addition, where the pump 92 is of the positive displacement type, means may be provided to de-energize the pump upon stoppage of the machine. However, where the pump is of the gear type, such means may be eliminated.

It will be apparent that in each of the embodiments described the stoppage of the drive means for the machine will result in the cutting off of pressure in the conduit supplying filling material to the containers being filled. When the machine is stopped, any containers which are being filled will continue to be filled to the level of the exhaust tube, after which the excess filling material will be drawn off to the vacuum chamber and returned to the source of supply unless or until the vacuum is shut off. This will not ordinarily be done during a temporary machine stoppage so that it is advisable to minimize the flow of the excess material as much as possible when the rotary parts of the machine are not in motion. The cut-off of pressure in the supply conduit will, of course, minimize the flow.

Modifications may, of course, be made in my invention without departing from the spirit of it. Having, however, described my invention in certain exemplary embodiments, what I claim as new and desire to secure and protect by Letters Patent is:

1. In a filling machine, a filling head having at least one filling spout structure associated therewith, container receiving and positioning means for juxtaposing containers to said filling spout, drive means for moving said container receiving and positioning means in a predetermined path of travel, a source of filling material under pressure connected to said filling head, valve means for controlling the flow of filling material to said filling head, and means responsive to the starting and stopping of said drive means for opening and closing said valve means so as to supply filling material under pressure to said filling head only at such times as said drive means is in operation.

2. The structure claimed in claim 1 wherein said source of supply comprises a supply tank positioned to supply filling material to said filling head by gravity flow, wherein a conduit connects said supply tank to said filling head, and wherein said valve means comprises a solenoid actuated valve in said conduit.

3. The structure claimed in claim 1 wherein said source of supply comprises a supply tank connected to said filling head by a conduit, wherein filling material is pumped under pressure through said conduit by means of a pump, and wherein said valve means comprises a solenoid actuated valve in said conduit.

4. The structure claimed in claim 1 wherein said source of supply comprises a closed reservoir, wherein means for exerting superatmospheric pressure are provided in communication with said reservoir, wherein said valve means comprises a two way valve in said means for applying pressure to said reservoir, said valve acting in one position to connect said reservoir with a source of gas under pressure and in the other position to connect said reservoir with the external atmosphere.

5. The structure claimed in claim 1 wherein said source of supply comprises a closed reservoir connected to said filling head by a conduit, wherein means for exerting superatmospheric pressure are provided in communication with said reservoir, and wherein said valve means comprises a solenoid actuated valve in said conduit.

6. In a rotary filling machine wherein a head element is supported on a rotating column driven by a prime mover, a source of filling material under pressure connected to said head element, and valve means immediately responsive to the starting and stopping of said prime mover motor for controlling the supply of filling material under pressure to said head element, said valve means acting to cut off the supply of filling materials to said head element upon stoppage of said machine.

7. The machine claimed in claim 6 wherein said valve means comprises a valve normally biased to cut off the supply of filling material under pressure, said valve means including a solenoid effective upon starting of said prime mover to open said valve to thereby permit the flow of filling material to said head element and effective upon stoppage of said prime mover to permit said valve to return to the cut-off position.

8. The machine claimed in claim 7 including a pressure regulator for controlling the pressure of the filling material supplied to said head element.

References Cited in the file of this patent
FOREIGN PATENTS 559,692    Germany _____ Sept. 26, 1932